United States Patent
Smith et al.

(10) Patent No.: US 8,938,574 B2
(45) Date of Patent: Jan. 20, 2015

(54) METHODS AND SYSTEMS USING SOLID-STATE DRIVES AS STORAGE CONTROLLER CACHE MEMORY

(75) Inventors: Gerald E. Smith, Longmont, CO (US); Basavaraj G. Hallyal, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 350 days.

(21) Appl. No.: 13/281,301

(22) Filed: Oct. 25, 2011

(65) Prior Publication Data

US 2012/0102268 A1 Apr. 26, 2012

Related U.S. Application Data

(60) Provisional application No. 61/406,598, filed on Oct. 26, 2010.

(51) Int. Cl.
*G06F 13/00* (2006.01)
*G06F 13/28* (2006.01)
*G06F 12/08* (2006.01)
*G06F 11/20* (2006.01)

(52) U.S. Cl.
CPC ........ *G06F 12/0873* (2013.01); *G06F 11/2089* (2013.01); *G06F 12/084* (2013.01); *G06F 11/2071* (2013.01); *G06F 2212/1016* (2013.01); *G06F 2212/222* (2013.01)
USPC ..... 711/103; 711/173; 711/129; 711/E12.008

(58) Field of Classification Search
None
See application file for complete search history.

(56) References Cited

U.S. PATENT DOCUMENTS

| | | | |
|---|---|---|---|
| 5,515,333 A | 5/1996 | Fujita et al. | |
| 7,206,875 B2 | 4/2007 | Marushak et al. | |
| 7,447,834 B2 | 11/2008 | Burroughs et al. | |
| 7,464,240 B2 | 12/2008 | Caulkins et al. | |
| 7,574,630 B1 | 8/2009 | Ranaweera et al. | |
| 7,634,688 B2 | 12/2009 | Madter et al. | |
| 7,721,021 B2 | 5/2010 | Johnson | |
| 7,809,886 B2 | 10/2010 | Ashmore et al. | |
| 7,996,509 B2 | 8/2011 | Basham et al. | |
| 2007/0276996 A1 | 11/2007 | Caulkins et al. | |
| 2007/0283173 A1 | 12/2007 | Webb et al. | |
| 2007/0294564 A1 | 12/2007 | Reddin et al. | |
| 2008/0290733 A1 | 11/2008 | Takahashi et al. | |
| 2008/0320214 A1 | 12/2008 | Ma et al. | |
| 2009/0083482 A1 | 3/2009 | Price et al. | |
| 2009/0132760 A1* | 5/2009 | Flynn et al. | 711/113 |
| 2009/0235038 A1 | 9/2009 | Sartore | |
| 2010/0293337 A1 | 11/2010 | Murphy et al. | |
| 2010/0332858 A1 | 12/2010 | Trantham et al. | |
| 2011/0010582 A1 | 1/2011 | Tsukamoto et al. | |
| 2011/0029847 A1 | 2/2011 | Goldenberg et al. | |
| 2011/0194231 A1 | 8/2011 | Aitchison et al. | |
| 2011/0276824 A1 | 11/2011 | Cheung | |
| 2013/0062949 A1 | 3/2013 | Yan | |

* cited by examiner

*Primary Examiner* — Eric S Cardwell
(74) *Attorney, Agent, or Firm* — Duft Bornsen & Fettig

(57) ABSTRACT

Methods and systems for using one or more solid-state drives (SSDs) as a shared cache memory for a plurality of storage controllers coupled with the SSDs and coupled with a plurality of storage devices through a common switched fabric communication medium. All controllers share access to the SSDs through the switched fabric and thus can assume control for a failed controller by, in part, accessing cached data of the failed controller in the shared SSDs.

20 Claims, 4 Drawing Sheets

METHODS AND SYSTEMS USING SOLID-STATE DRIVES AS STORAGE CONTROLLER CACHE MEMORY

This patent application claims priority to U.S. Provisional Patent Application Ser. No. 61/406,598 filed 26 Oct. 2010 entitled DAS High Availability Solutions which is hereby incorporated by reference.

BACKGROUND

1. Field of the Invention

The invention relates generally to high availability storage systems and more specifically relates to use of shared solid-state drives (SSDs) as cache memory for each of multiple storage controllers in a high availability storage system.

2. Discussion of Related Art

High availability storage systems, such as RAID (Redundant Array of Independent Drives) storage systems typically include multiple storage controllers acting in roles such that each controller may assume control from another controller that has failed. All the storage controllers are coupled with a plurality of storage devices (e.g., magnetic, optical, and solid-state storage devices) for persistent storage of user data. Typically the user data is stored in a fashion that provides redundancy information to allow continued operation of the storage system in the event of a failure of one or more of the storage devices (as well as one or more of the storage controllers).

To maintain high performance levels in such storage systems, each storage controller includes a cache memory used by the processor of the storage controller to temporarily store user data until the data is eventually posted or flushed to the persistent storage devices of the system. Write requests received by a storage controller from an attached host system are generally processed by storing the user's data (from the write request) into the cache memory. The write request from the host may be completed quickly after the data is cached. The storage controller may then later post or flush the cached user data to the persistent storage of the system.

In high availability storage systems where each controller may serve as a substitute for a failed controller, the contents of the cache memory of each controller must be available to other controllers to permit the other controller to assume control over the processing of the failed controller. In other words, the cache memory of the various storage controllers must be "synchronized" such that each controller is in possession of the same cached data in case one controller assumes control over the operations of another failed controller. In present high availability storage systems, the cache memory contents may be synchronized among the storage controller by either of two general approaches. In one present practice, the host systems may generate the same write request to multiple storage systems so that each of the multiple storage systems has the same information available. In another present practice, the storage controllers communicate with one another to synchronize cache memory contents so that another controller may assume control from a failed controller.

In all present solutions, the inter-controller communications to synchronize cache memory contents can generate a significant volume of communication overhead. Where a storage system consists of only two controllers (a redundant pair operating either in a dual-active or an active-passive mode), this overhead may be tolerable. However, where a storage system scales up to more than two controllers, the overhead processing and communications to maintain cache content synchronization can be onerous. In addition, where multiple redundant controllers each have private cache memories and they communicate to maintain synchronization, additional problems are presented to determine which cache has the correct data when a failed controller is restored to full operation (e.g., by swapping out the controller, etc.). The communications to update the cache of a replacement controller and to flush data from the private cache memories of the controllers to the persistent storage of the storage devices further over-utilizes the available bandwidth of the switched fabric communications. Still further, other management functions performed by storage controllers in a clustered environment may require similar inter-controller communications and thus add still further to the burden of inter-controller communications.

Thus it is an ongoing challenge to provide for cache content synchronization and other cluster management functions among a plurality of storage controllers in a high availability storage system while reducing overhead processing and communications associated therewith in the storage controllers.

SUMMARY

The present invention solves the above and other problems, thereby advancing the state of the useful arts, by providing methods and systems for utilizing shared solid-state drives (SSDs) as cache memories for each of a plurality of storage controllers. The SSDs are coupled with all of the storage controllers through a switched fabric communication medium that also couples the storage controllers to a plurality of storage devices. Since all controllers are coupled with each of the one or more SSDs used as cache memories, any controller can assume control for a failed controller ("failover") by, in part, accessing the cached data of the failed controller in the shared SSDs on the switched fabric. The SSD cache is also utilized to satisfy read requests. In some exemplary embodiments, the capacity of the one or more SSDs is partitioned such that a portion is associated with each storage controller. In other exemplary embodiments, the SSD capacity is partitioned such that a portion is associated with each of a plurality of logical volumes configured within the plurality of storage devices.

In one aspect hereof, a system is provided comprising a plurality of storage controllers adapted to couple with one or more host systems and a plurality of storage devices for persistent storage of user data received from the one or more host systems. A switched fabric communication medium couples the plurality of storage controllers with each of the plurality of storage devices. The system further comprises a solid-state drive (SSD) coupled with each of the plurality of storage controllers through the switched fabric communication medium. Each of the plurality of storage controllers uses the SSD as a cache memory.

Another aspect hereof provides a system comprising a plurality of storage controllers adapted to couple with one or more host systems and a plurality of storage devices for persistent storage of user data received from the one or more host systems. The system further comprises a switched fabric communication medium coupling the plurality of storage controllers with each of the plurality of storage devices. The switched fabric communication medium comprises two switching devices wherein each switching device comprises a solid-state drive (SSD) used to cache data received from the storage controllers in processing write requests from attached host systems directed to one or more of the plurality of storage devices. Each of the two switching devices mirrors cached data from its SSD to the SSD of the other of the two switching devices using the switched fabric communication medium.

The SSD memories used as cache memories also may be used to process read requests. The mirrored SSD cache memories residing within the switching devices also avoids a single point of failure in the caching of data.

Yet another aspect hereof provides a method comprising receiving a write request in a storage controller of the plurality of storage controllers. Each write request is directed to a logical volume configured on portions of one or more of a plurality of storage devices. The method caches data associated with the write request from the storage controller into an SSD coupled with the storage controller through a switched fabric communication medium that also couples the controllers to the plurality of storage devices. The method then flushes cached data from the SSD to the logical volume for persistent storage.

DETAILED DESCRIPTION OF THE DRAWINGS

Figure 1:
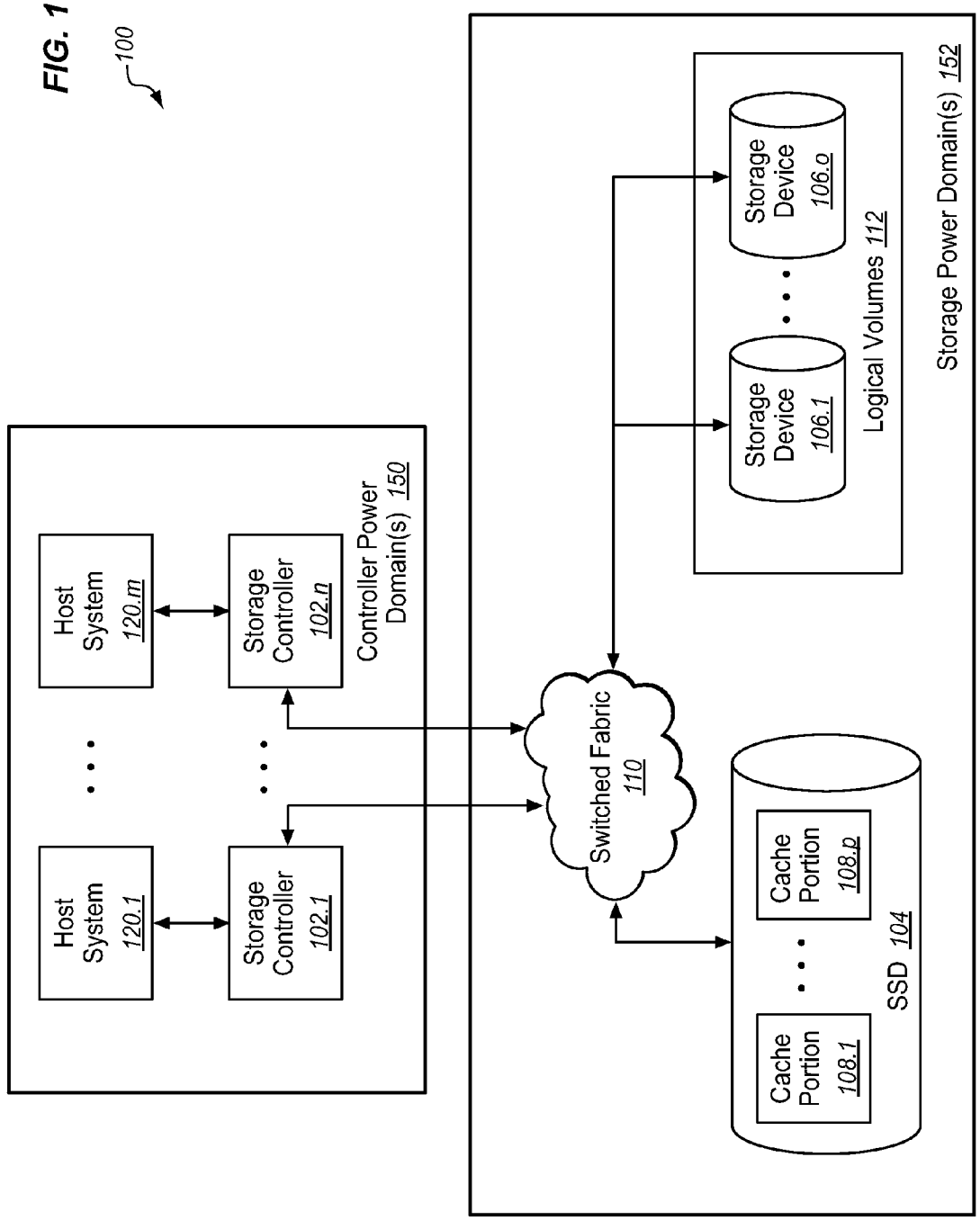
FIGS. 1 and 2 are block diagrams of exemplary systems enhanced in accordance with features and aspects hereof to use solid-state drives (SSDs) as cache memory shared by each of a plurality of storage controllers.

FIG. 1 is a block diagram of an exemplary system 100 enhanced in accordance with features and aspects hereof to utilize one or more solid-state drives (SSDs) 108.1 through 108.$p$ as cache memory (singly and collective sometimes referred to herein by the common reference number 108). System 100 includes a plurality of storage controllers 102.1 through 102.$n$ (sometimes singly and collectively referred to herein by the common reference number 102). Each storage controller 102 comprises any suitable electronic component or device adapted to receive I/O requests from one or more host systems 120.1 through 120.$m$ and adapted to process each received I/O request by accessing data on an identified volume of one or more logical volumes 112. In some exemplary embodiments, each storage controller 102 comprises a general and/or special purpose processor coupled with associated program memory for storing programmed instructions and data to control operation of the storage controller. In some exemplary embodiments, storage controller 102 may be physically integrated within a corresponding host system 120 (e.g., as a host bus adapter (HBA) or as circuits integrated with the computational circuits of the host system). In other exemplary embodiments, storage controllers 102 may be physically integrated with other components of a storage system and coupled with host systems 120 through any suitable communication medium and protocol such as Serial Attached SCSI (SAS), Fibre Channel (FC), Serial Advanced Technology Attachment (SATA), etc.

Each logical volume 112 comprises portions of one or more storage devices 106.1 through 106.$o$ (singly and collectively sometimes referred to herein by the common reference number 106). In one exemplary embodiment, storage devices 106 each comprise a rotating magnetic or optical storage device (e.g., a rotating magnetic medium disk drive) or a solid-state drive.

Each of the plurality of storage controllers is coupled to the plurality of storage devices 106 and to the one or more SSDs 108 through a switched fabric communication medium 110. Switched fabric 110 may use any of several well-known, commercially available communication media and protocols including, for example, SAS, FC, Ethernet, etc. Thus, each storage controller 102 has access to any of SSDs 108 to use as a cache memory in processing received I/O requests. More specifically, in accordance with features and aspects hereof, in processing a received write request, a storage controller caches the data to be written (and associated meta-data) in a corresponding portion of the one or more SSDs 108. At some later time determined by the storage controller, the cached data is retrieved from the SSD 108 (used as a temporary cache memory) and is flushed for persistent storage to appropriate locations identified by the cached mea-data on the identified logical volume 112. When a storage controller 102 fails, another controller may assume control of the operations being performed by the failed controller and may access its cached data (user data and meta-data) in SSDs 108.

In some exemplary embodiments, each logical volume 112 configured on the plurality of storage devices 106 may be associated with a corresponding portion of the capacity of the SSDs 108. In such embodiments, each storage controller 102 uses a portion of SSDs 108 that corresponds to a logical volume 112 addressed in a write request to cache write data for that logical volume. If a storage controller 102 fails, any other storage controller may assume responsibility for the failed controller's operations by accessing the cached data in the portions of SSDs 108 that correspond to logical volumes accessed by the failed storage controller. In other exemplary embodiments, each storage controller 102 is associated with a corresponding portion of the capacity of SSDs 108. In such embodiments. Each storage controller 102 uses its corresponding portion of SSDs 108 for caching of write data directed to any logical volume configured on the plurality of storage devices 106. If a storage controller fails, another controller 102 may assume control of the failed controller's operations by access to the failed controller's portion of SSDs 108.

The system may be further enhanced to dynamically modify the size of a portion of SSDs 108 associated with each volume or with each controller based on loading of the system. Where each portion of SSDs 108 is associated with a corresponding logical volume, logical volumes receiving more write operations than other logical volumes may be allocated larger portions of the capacity of SSDs 108. Where portions of SSDs 108 are each associated with a corresponding controller 102, controllers processing more write requests than other controllers may be allocated larger portions of the capacity of SSDs 108.

In some embodiments of system 100, storage controllers 102 may be physically associated with a first power domain (e.g., a group of one or more "controller power domains" 150). For example, each controller 102 may be associated with a controller power domain of a corresponding host system 120 in which the controller physically resides. Or, for example, all controllers 102 may reside in one or more controller power domains used for all controllers of a storage system 100. By contrast, switched fabric 110, SSDs 108, and storage devices 106 are associated with one or more storage power domains 152 separate and distinct from controller power domains 150. In this manner, loss of power for one or more storage controllers 102 does not prevent access to stored data by other controllers that remain operable. The switched fabric, SSDs used as cache, and the storage devices all remain powered in one or more separate storage power domains 152 so that other controllers 102 that remain operable may access the stored data as well as the temporary cached data of other controllers.

Figure 2:
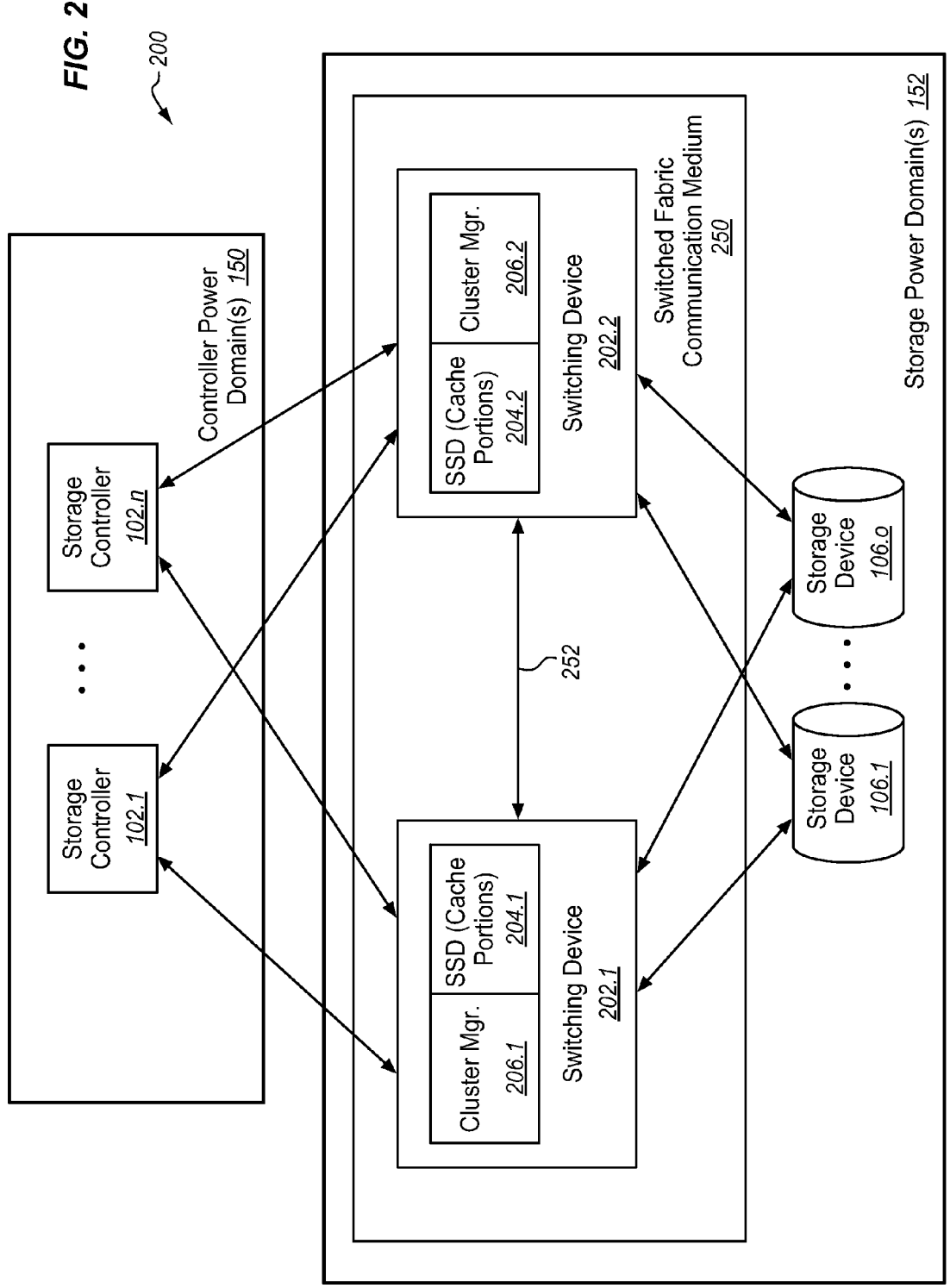

FIG. 2 shows another exemplary embodiment of an enhanced system 200 in which a plurality of storage controllers 102 (powered within one or more controllers power domains 150) share access to SSDs for use as temporary cache memories in processing received I/O requests. As in FIG. 1, switched fabric communication medium 250 and a plurality of storage devices 106 are powered in one or more storage power domains 152 separate and distinct from controller power domains 150. Switched fabric 25 comprises two (or more) switching devices 202.1 and 202.2 that, in combination, couple all controllers 102 with any storage device 106. Further, switching devices 202.1 and 202.2 are coupled with one another (path 252) to permit inter-switch communications. Switched fabric 250 may comprise any of several well-known communication media and protocols including, for example, SAS, FC, and Ethernet. For example, fabric 250 may be a SAS fabric in which switching devices 202.1 and 202.2 are each SAS expanders. The SAS expanders couple with one another through respective ports and couple controller 102 with storage devices 106 through corresponding ports.

Each switching device 202.1 and 202.2 comprises an SSD 204.1 and 204.2, respectively, used by controllers 102 as temporary cache memory in processing I/O requests. Any controller 102 can access either SSD of either switching device. Further, the switching devices 202.1 and 202.2 may access one another to permit synchronization of the content of their respective SSDs 204.1 and 204.2. Thus, any storage controller 102 may assume control for any other failed storage controller 102 by, in part, accessing cached data (and meta-data) of the failed controller through the SSD of either switching device. Cluster management logic 206.1 and 206.2 within switching devices 202.1 and 202.2 may manage the synchronization of cached data in the SSDs of the respective devices 202.1 and 202.2. In addition, cluster management logic 206.1 and 206.2 may manage other aspects of shared data and control within switched fabric 250. For example, SCSI zone permission information and other cluster management information may be shared among the switching devices 202.1 and 202.2 under control of cluster management logic 206.1 and 206.2, respectively.

Those of ordinary skill in the art will readily recognize numerous equivalent and additional elements that may be present in a fully functional system such as systems 100 and 200 of FIGS. 1 and 2. Such additional and equivalent elements are omitted herein for simplicity and brevity of this discussion. In addition, those of ordinary skill in the art will recognize that any number of storage controllers and storage devices may be present in systems such as systems 100 and 200 limited by the features of the particular switched fabric communication medium and protocol. Further, any number of SSD devices of any useful capacity may be used as the cache memories within the switched fabric. In particular, though FIG. 2 depicts a pair of switching devices (each with one or more SSDs integrated), those of ordinary skill will recognize that any number of such switches may be used within the switched fabric.

Figure 3:
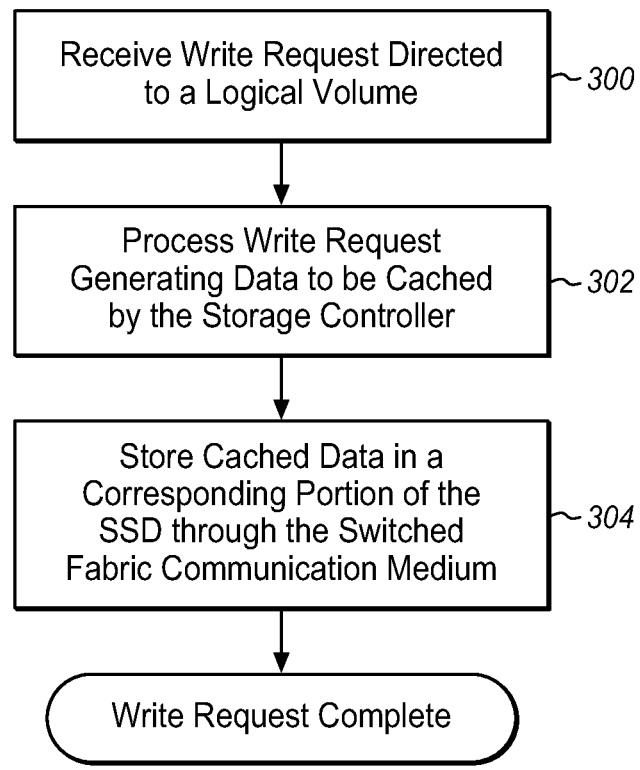
FIGS. 3 through 7 are flowcharts describing exemplary methods in accordance with features and aspects hereof to used SSDs coupled with storage controllers through a switched fabric as shared cache memory for the controllers.
Figure 4:
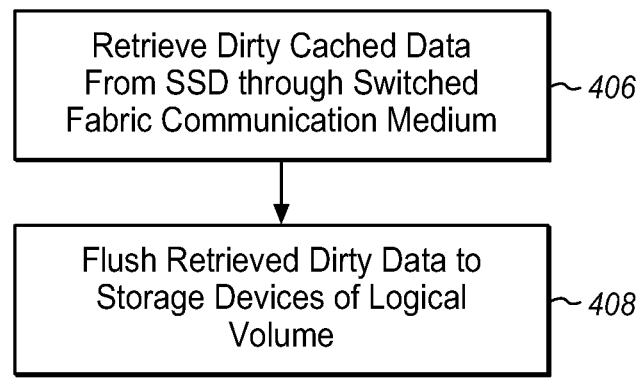

FIGS. 3 and 4 are flowcharts describing exemplary methods of operating a system such as system 100 of FIG. 1 in accordance with features and aspects hereof. In particular, the methods of FIGS. 3 and 4 may be performed by each of the one or more storage controllers 102 of FIG. 1. At step 300, a controller receives a write request from an attached host system. The write request comprises user data to be stored at an identified location of an identified logical volume. At step 302, the storage controller processes the write request to generate data (user data and meta-data) to be temporarily stored in a cache memory. At step 304, the controller completes the write requests by storing the generated cache data in a corresponding portion of one or more SSDs coupled with the controller through a switched fabric communication medium. As noted above, the portion of the SSDs may be a portion that corresponds to this storage controller or may be a portion corresponding to the identified logical volume. Since the SSDs are coupled with all storage controllers through the switched fabric, all storage controllers may access the cached data for all other storage controllers or for all logical volumes (in accordance with the selected partitioning of the SSD capacity). Thus, in the event of a failed controller, any other storage controller may assume responsibility for the I/O requests processed by that failed controller (e.g., may assume ownership of any volumes managed by the failed controller and may access all of the failed controller's cached data).

Continuing the method with FIG. 4, as with use of any cache memory, at some later time at step 406, the storage controller may retrieve any dirty data (data not yet flushed for persistent storage on the storage devices) and at step 408 post or flush the retrieved dirty data to appropriate locations of appropriate storage devices (as determined by the mapping of an identified logical volume to portions of one or more storage devices). The cached data is read from the SSDs through the switched fabric communication medium that couples all storage controllers with all of the storage devices and with all of the one or more SSDs used for temporary caching of data.

Figure 5:
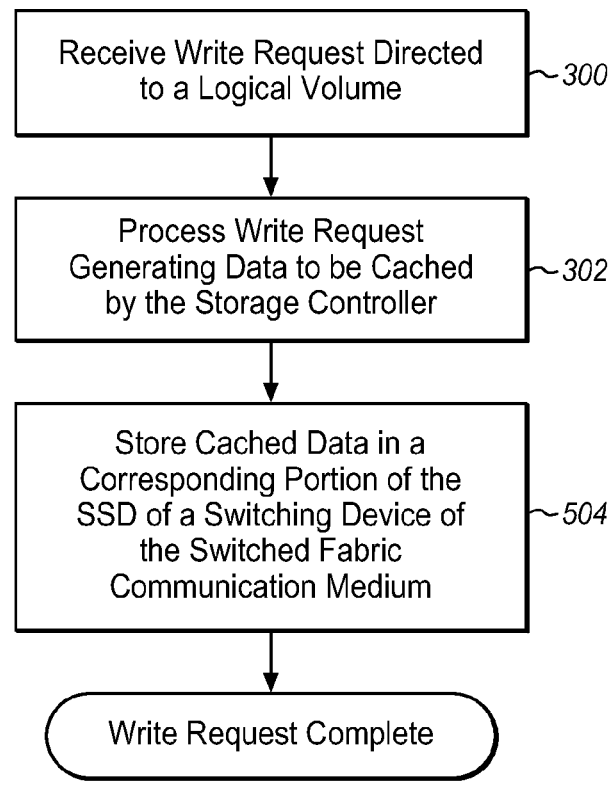
Figure 6:
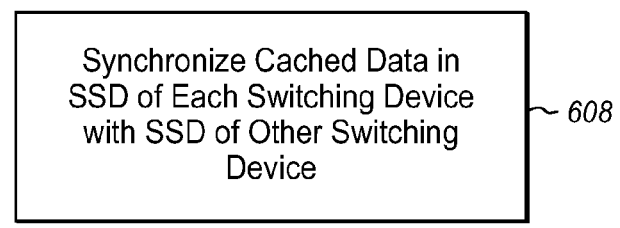
Figure 7:
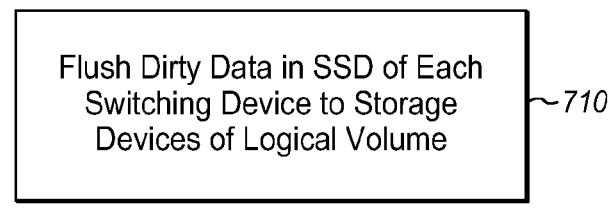

FIGS. 5 through 7 are flowcharts describing another exemplary method operable on a system such as system 200 of FIG. 2 in accordance with features and aspects hereof. In particular, portions of the methods of FIGS. 5 through 7 are performed by the storage controllers while other portions are performed by the switching devices of the switched fabric communication medium. The method of FIG. 5 is similar to that of FIG. 3 but differs in that the SSD used as cache memory by the storage controllers resides within switching devices of the switched fabric communication medium. Thus, the switching devices assume responsibility for assuring that multiple SSDs used as cache memory by the storage controllers are synchronized (each SSD has identical copies of the cached data stored in either SSD). Thus, any storage controller may assume responsibility for a failed storage controller by, in part, accessing its cached data.

Steps 300 and 302 are identical to the same steps of FIG. 3 in that a storage controller receives and processes a write request to generated data to be temporarily cached to complete the request. At step 504, the storage controller stores the generated cache data in a portion of the SSD within one of the switching devices of the switched fabric (e.g., a portion associated with the storage controller or a portion associated with the logical volume identified by the write request). The switched fabric couples all storage controllers with the switching devices and thus with all storage devices. As noted above in FIG. 2, the switching devices may comprise cluster management logic that, in part, assures that the content of each switching devices SSD is mirrored to other SSDs of other switching devices that comprise the switched fabric.

Continuing the methods with reference to FIG. 6, at some later time, at step 608, the cluster management logic of the switching devices assures synchronization of cached data within the SSD cache memories of each of the switching devices. Still further, with reference to FIG. 7, at some time, at step 710, the cluster management logic of a switching device flushes dirty data from the SSD cache memory to appropriate locations on appropriate storage devices (based on the meta-data cached with the user data).

Those of ordinary skill in the art will readily recognize numerous equivalent and additional steps that may be present in fully functional methods such as the methods of FIGS. 3 through 7. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A system comprising:
a plurality of storage controllers adapted to couple with one or more host systems;
a plurality of storage devices for persistent storage of user data received from the one or more host systems;
a switched fabric communication medium coupling the plurality of storage controllers with each of the plurality of storage devices; and
a solid-state drive (SSD);
wherein each of the plurality of storage controllers is coupled through the switched fabric communication medium with the SSD, each of the plurality of storage controllers uses a different portion of the SSD as a cache memory, and
each of the plurality of storage controllers is operable to assume control for a failed storage controller by accessing, via the switched fabric communication medium, cached data for the failed storage controller in a portion of the SSD used by the failed storage controller.

2. The system of claim 1
wherein each of the plurality of storage controllers uses its portion of the SSD as a cache memory for a logical volume managed by the storage controller.

3. The system of claim 1
wherein each of the plurality of storage controllers uses the SSD as a cache memory by storing data for write requests from a host on the SSD.

4. The system of claim 1
wherein the system dynamically adjusts the size of the portion corresponding to each storage controller based on a load associated with each storage controller.

5. The system of claim 1
wherein a plurality of logical volumes are configured on the plurality of storage devices by the plurality of storage controllers,
wherein each of the plurality of logical volumes is associated with a corresponding portion of the SSD, and
wherein each storage controller of the plurality of storage controllers uses as its cache memory a portion of the SSD corresponding to a logical volume accessed by a request from said each storage controller.

6. The system of claim 5
wherein the system dynamically adjusts the size of the portion of the SSD corresponding to each logical volume based on a load associated with each logical volume.

7. The system of claim 1
wherein each of the plurality of storage controllers is operable in a corresponding controller power domain of a plurality of controller power domains,
wherein the SSD, the plurality of storage devices, and the switched fabric communication medium are operable in one or more power domains separate from the plurality of controller power domains, and
whereby, responsive to loss of a controller power domain associated with a first storage controller, the SSD, the plurality of storage devices, and the switched fabric communication medium remain accessible to other storage controllers in other controller power domains through the switched fabric communication medium.

8. A system comprising:
a plurality of storage controllers adapted to couple with one or more host systems;
a plurality of storage devices for persistent storage of user data received from the one or more host systems;
a switched fabric communication medium coupling the plurality of storage controllers with each of the plurality of storage devices, the switched fabric communication medium comprising two switching devices,
wherein each switching device comprises a solid-state drive (SSD), and each SSD is used to cache data received from the plurality of storage controllers in processing write requests from attached host systems directed to one or more of the plurality of storage devices, and
wherein each of the two switching devices mirrors cached data from its SSD to the SSD of the other of the two switching devices using the switched fabric communication medium,
wherein each of the plurality of storage controllers uses a different portion of the SSDs as a cache memory, and each of the plurality of storage controllers is operable to assume control for a failed storage controller by accessing, via the switched fabric communication medium, cached data for the failed storage controller in a portion of the SSDs used by the failed storage controller.

9. The system of claim 8
wherein the switching devices associate each of the plurality of storage controllers with a corresponding portion for a logical volume managed by the storage controller.

10. The system of claim 8
wherein each of the switching devices comprises a Serial Attached Small Computer System Interface (SAS) expander.

11. The system of claim 8
wherein each switching device dynamically adjusts the size of the portion corresponding to each storage controller based on a load associated with each storage controller.

12. The system of claim 8
wherein a plurality of logical volumes are configured on the plurality of storage devices by the plurality of storage controllers,
wherein each of the plurality of logical volumes is associated with a corresponding portion of the SSD of each switching device, and
wherein each storage controller of the plurality of storage controllers uses as its cache memory a portion of the SSD of each switching device corresponding to a logical volume accessed by a request from said each storage controller.

13. The system of claim 12
wherein each switching device dynamically adjusts the size of the portion of its SSD corresponding to each logical volume based on a load associated with each logical volume.

14. The system of claim 8, further comprising:
a plurality of power domains wherein each of the plurality of storage controllers is operable in a corresponding controller power domain of the plurality of controller power domains; and
one or more storage power domains separate from the plurality of controller power domains, wherein the plurality of storage devices and the switched fabric communication medium are operable in the one or more storage power domains, and
whereby, responsive to loss of a controller power domain associated with a first storage controller, the switched fabric communication medium and the plurality of storage devices remain accessible to other storage controllers in other controller power domains through the switched fabric communication medium.

15. A method operable in a system, the system comprising a plurality of storage controllers coupled with a plurality of storage devices through a switched fabric communication medium, the system further comprising a solid-state drive (SSD), wherein each of the plurality of storage controllers is coupled through the switched fabric communication medium to the SSD, and each of the plurality of storage controllers uses a different portion of the SSD as a cache memory, the method comprising:
receiving a write request in a storage controller of the plurality of storage controllers, the write request directed to a logical volume configured on portions of one or more of the plurality of storage devices;
caching data associated with the write request from the storage controller into the SSD;
receiving another write request in another storage controller of the plurality of storage controllers, the write request directed to a logical volume configured on portions of one or more of the plurality of storage devices;
caching data associated with the other write request from the other storage controller into the SSD;
flushing cached data from the SSD for persistent storage; and
assuming control for a failed storage controller by accessing, via the switched fabric communication medium, cached data for the failed storage controller in a portion of the SSD used by the failed storage controller.

16. The method of claim 15 further comprising:
allocating a corresponding portion of the SSD for use by each controller of the plurality of storage controllers to cache data associated with a received write request for a logical volume managed by the storage controller.

17. The method of claim 15 further comprising:
adjusting a size of a portion of the SSD corresponding to a storage controller based on a load associated with the storage controller.

18. The method of claim 15
wherein a plurality of logical volumes are configured on corresponding portions of one or more of the plurality of storage devices,
wherein the method further comprises:
allocating a corresponding portion of the SSD for each of the plurality of logical volumes wherein each storage controller uses the corresponding portion for a logical volume accessed by said each storage controller in processing a received write request to cache data associated with the write request.

19. A method operable in a system, the system comprising a plurality of storage controllers coupled with a plurality of storage devices through a switched fabric communication medium, the switched fabric communication medium comprising two switching devices coupling each of the plurality of storage controllers with each of the plurality of storage devices, each switching device comprising a solid-state drive (SSD), wherein each of the plurality of storage controllers is coupled through the switched fabric communication medium with each of the SSDs, and each of the plurality of storage controllers uses a different portion of the SSD as a cache memory, the method comprising:
receiving a write request in a storage controller of the plurality of storage controllers, the write request directed to a logical volume configured on portions of one or more of the plurality of storage devices;
caching data associated with the write request from the storage controller into the SSD of one or more of the switching devices;
synchronizing cached data between the two switching devices;
flushing cached data from the SSD of one or more of the switching devices to the logical volume for persistent storage;
receiving another write request in another storage controller of the plurality of storage controllers, the other write request directed to a logical volume configured on portions of one or more of the plurality of storage devices;
caching data associated with the other write request from the other storage controller into the SSD of one or more of the switching devices; and
assuming control for a failed storage controller by accessing, via the switched fabric communication medium, cached data for the failed storage controller in a portion of the SSDs used by the failed storage controller.

20. The method of claim 19
wherein each of the switching devices comprises a Serial Attached Small Computer System Interface (SAS) expander.

* * * * *